(12) United States Patent
Melistas et al.

(10) Patent No.: US 9,742,175 B2
(45) Date of Patent: Aug. 22, 2017

(54) CHILD RESISTANT ELECTRICAL OUTLET AND SWITCH COVER

(71) Applicants: George D. Melistas, Northville, MI (US); Kaliopi E. Melistas, Northville, MI (US)

(72) Inventors: George D. Melistas, Northville, MI (US); Kaliopi E. Melistas, Northville, MI (US)

( * ) Notice: Subject to any disclaimer, the term of this patent is extended or adjusted under 35 U.S.C. 154(b) by 0 days.

(21) Appl. No.: 15/153,233

(22) Filed: May 12, 2016

(65) Prior Publication Data

US 2016/0336726 A1 Nov. 17, 2016

Related U.S. Application Data

(60) Provisional application No. 62/160,041, filed on May 12, 2015.

(51) Int. Cl.
*H02G 3/14* (2006.01)

(52) U.S. Cl.
CPC ..................... *H02G 3/14* (2013.01)

(58) Field of Classification Search
USPC .......................................... 174/67
See application file for complete search history.

(56) References Cited

U.S. PATENT DOCUMENTS

| | | | |
|---|---|---|---|
| 4,688,023 A | 8/1987 | McGill et al. | |
| 4,950,842 A | 8/1990 | Mennings | |
| 5,297,973 A | 3/1994 | Gorman | |
| 6,108,178 A | 8/2000 | Beadles | |
| 6,545,218 B1 | 4/2003 | Blaess | |
| 6,669,492 B1 | 12/2003 | McIlvenna | |
| 7,401,610 B1 | 7/2008 | Cherry | |
| 7,554,036 B1 * | 6/2009 | DeCosta | H02G 3/14 174/53 |
| 7,595,449 B1 | 9/2009 | Dyderski | |
| 7,674,975 B2 | 3/2010 | Atkinson | |

* cited by examiner

*Primary Examiner* — Dhirubhai R Patel
(74) *Attorney, Agent, or Firm* — Warn Partners, P.C.

(57) ABSTRACT

A safety cover system for a household electrical switch or outlet is provided. A wall plate is provided having an aperture for an electrical device such as an outlet or switch. The wall plate has a rim with upper and lower locking lips. A cover plate is provided that is pivotally connected to the wall plate by hinges for covering the wall plate. There is provided upper, lower and side release mechanisms. Each release mechanism includes a release button with a portion of the release button exposed to an exterior of the cover plate through an aperture in the cover plate. The release also includes a latch connected with the button having an arm overlapping the wall plate rim lip to prevent the cover plate from being pivoted open from the wall plate.

9 Claims, 13 Drawing Sheets

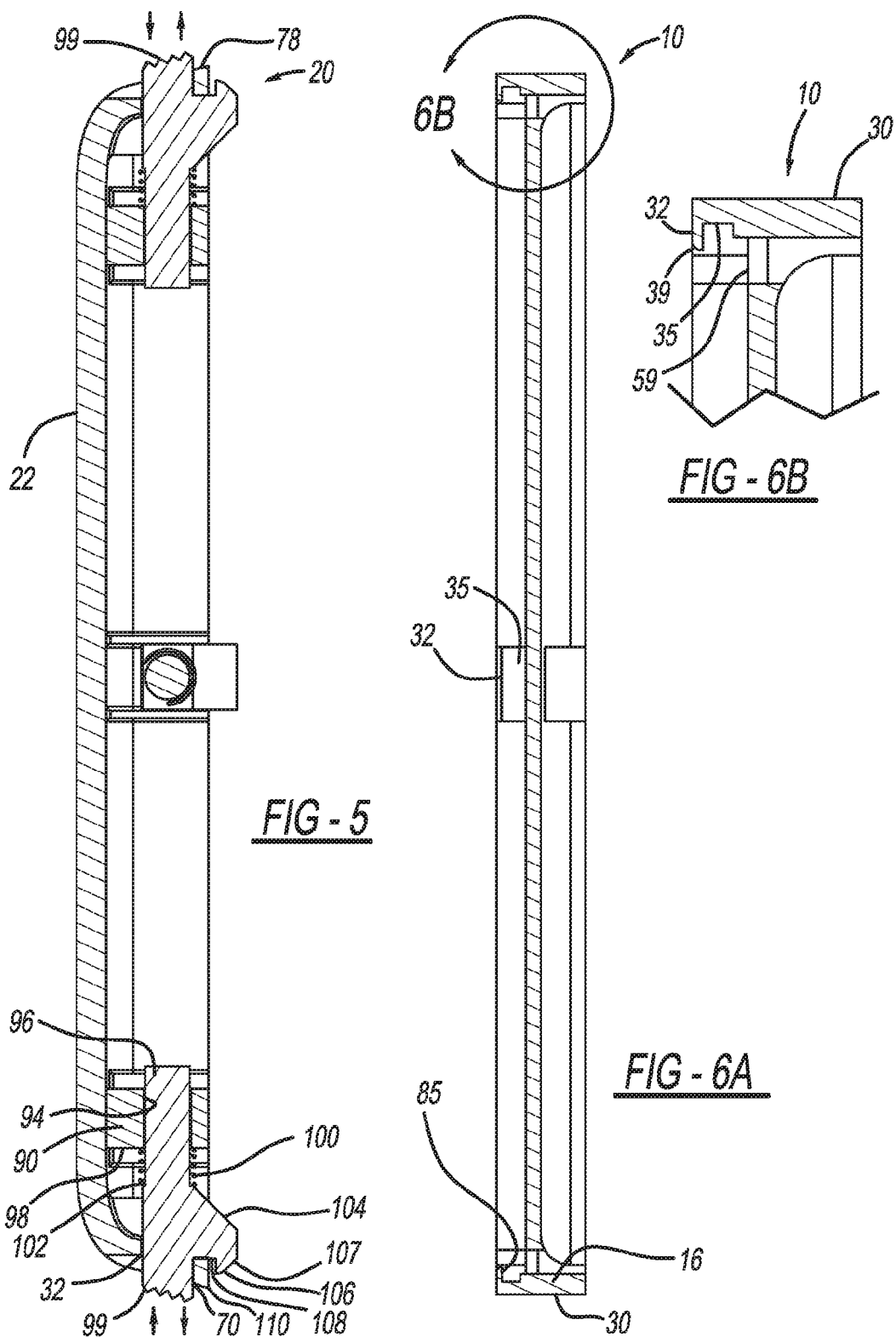

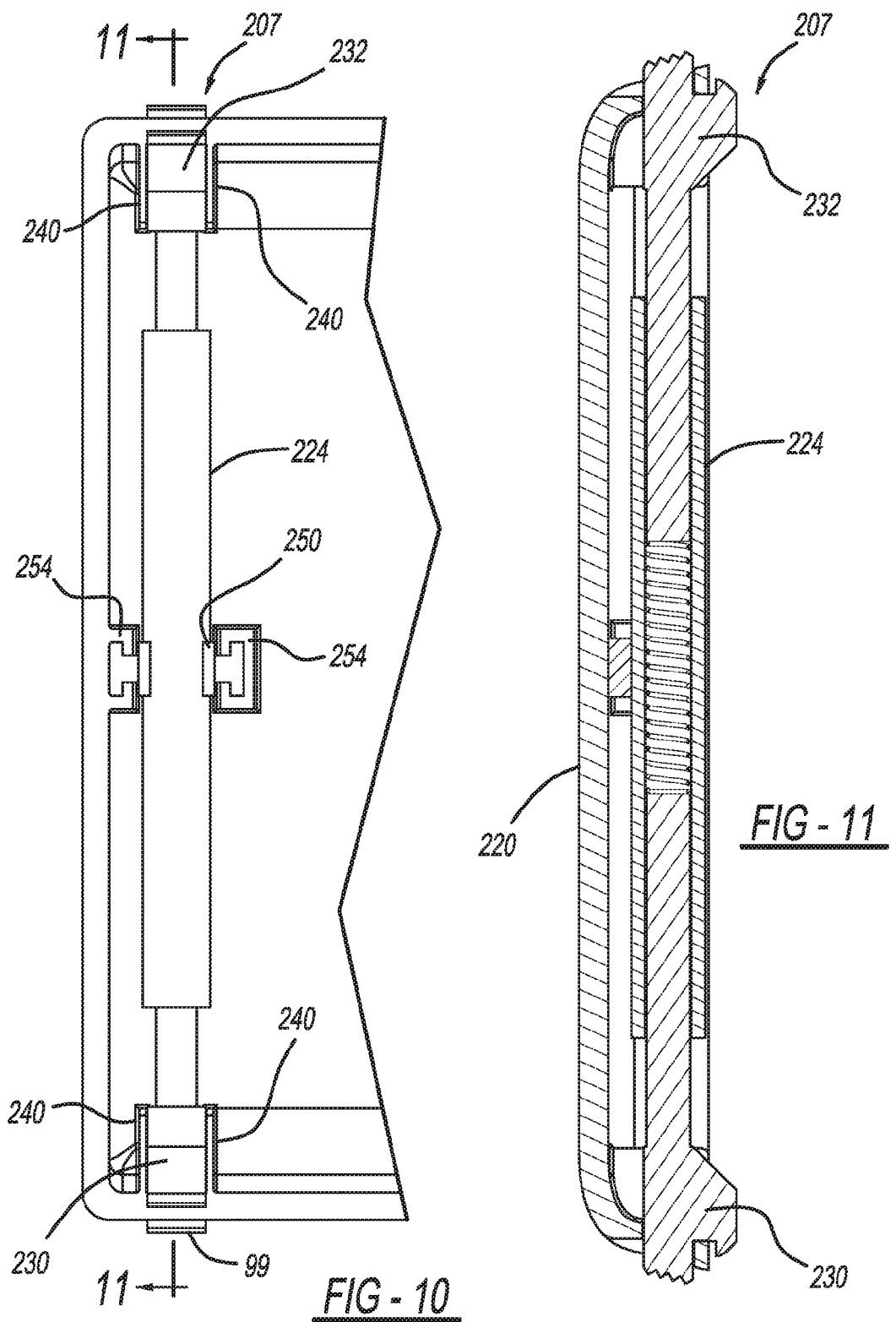

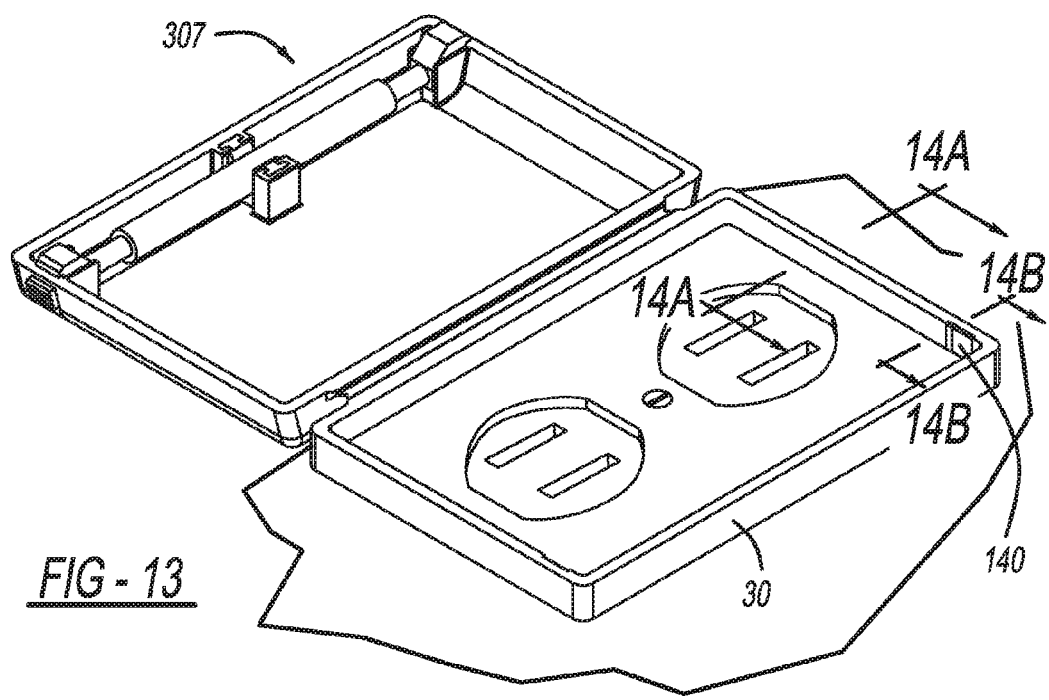
FIG - 13
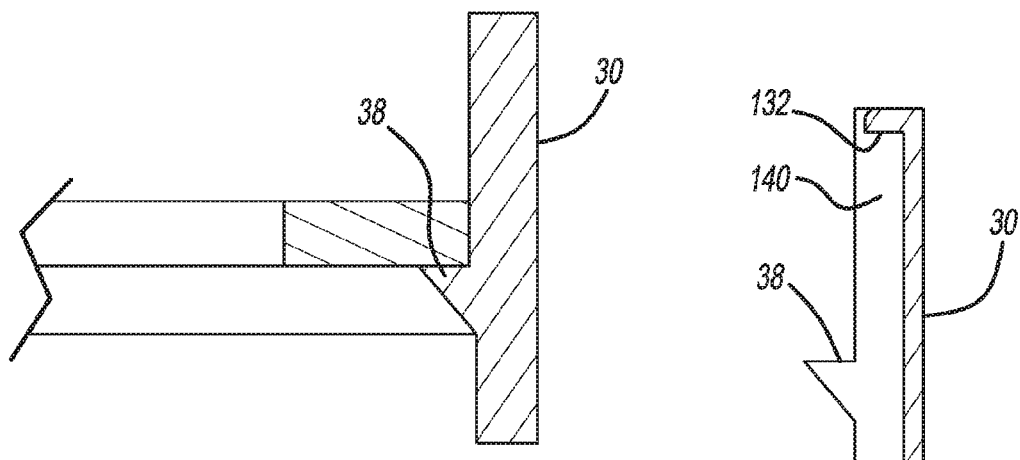
FIG - 14A
FIG - 14B

CHILD RESISTANT ELECTRICAL OUTLET AND SWITCH COVER

CROSS-REFERENCE TO RELATED APPLICATIONS

This application claims the benefit of U.S. Provisional Application No. 62/160,041, filed May 12, 2015. The disclosure of the above application is incorporated herein by reference.

FIELD OF THE INVENTION

The present invention relates to a child resistant safety cover system for an electrical outlet, switch or other similar device.

BACKGROUND OF THE INVENTION

Children have often been prone to curiosity as to electrical switches and devices. This curiosity manifests itself in many ways. In particular, sometimes children are curious to try and insert things and play with an electrical receptacle. Of course this conduct is dangerous and should be avoided.

With respect to wall switches there may be danger if a child decides to actuate a garbage disposal or other device which may pose a hazard. Additionally, children often can "play" with a light switch ad nauseum to the detriment of parental patience and all the time wasting valuable energy by unnecessary flickering of lights and wear on these lights along with leaving lights on all over a house which wastes energy. To prevent injuries to small children, save energy, and maintain parental sanity it is desirable to have a child resistant cover over electrical outlets and electrical switches.

It is desirable to provide a child resistant electrical outlet cover that can be readily used for various types of household electrical outlets or electrical switches. It is desirable to provide a child resistant electrical outlet cover that has high reliability and is resistant to failure from high usage. It is desirable to provide a child resistant electrical outlet cover that is even more challenging for small children to open than prior child resistant electrical outlet and switch covers. It is desirable to provide a child resistant electrical device cover that when closed will prevent the nuisance and energy cost associated with children playing with the light switch. It is desirable to provide a child resistant electrical device cover that will prevent injury to children by preventing accidents due to inadvertent operation of garbage disposals, gas fireplaces or other electrically controlled devices.

SUMMARY OF THE INVENTION

To make manifest the above noted and other desires, a revelation of the present invention is brought forth. In a preferred embodiment the present invention endows a freedom of a safety cover system for a household electrical switch or outlet. A wall plate is provided having an aperture for an electrical device such as an outlet or switch. The wall plate has a rim with upper and lower locking lips. A cover plate is provided that is pivotally connected to the wall plate by a hinge such as a living hinge for covering the wall plate. There is, at a minimum, provided upper and lower independently actuated release mechanisms. Each release mechanism includes a release button with a portion of the release button exposed to an exterior of the cover plate through an aperture in the cover plate. The release also includes a latch connected with the button having an arm overlapping the wall plate rim lip to prevent the cover plate from being pivoted open from the wall plate. The release mechanism also has a plunger rod connected to the release button. The release mechanism also has a spring mount and a spring captured between the spring mount and the button to bias the button into a locked position.

The release mechanisms are preferably spaced on opposite sides of the cover which it has been determined is a distance which is substantially impossible for a child's hands to span and coordinate the opening mechanism. In a second embodiment a third mechanism is used in the face of the plate which provides further security in which the dexterity and size of a child's hand is substantially hindered from opening the cover. The cover is either integrally formed for each plug or switch application or in an alternate embodiment interchangeable plates are provided for a single product that fits most all outlets and switches.

Thus, in accordance with the present invention, the invention prevents injuries, maintains parental sanity and also serves as an Energy Saver (i.e. cuts down on electricity costs) because it prevents children/toddlers from turning the electrical switches ON and OFF when the unit is closed in the lock position. This habit that children and toddlers have of constantly turning the lights ON and OFF can also be a huge nuisance to parents, family and guests. When the unit is in the locked position, this nuisance goes away.

Furthermore, when this device is mounted over a switch that controls a garbage disposal system (typically mounted beneath a kitchen sink) or when mounted over an electric switch that controls an electric or gas fireplace, it will prevent a child from inadvertent or accidental injury (i.e. hand(s) or finger(s) injury in the garbage disposal or from touching the hot fireplace glass doors and getting possible burns).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a sectional view taken along lines 5-5 of FIG. 4;

FIG. 6A is a side elevational view taken along lines 6-6 of FIG. 1;

FIG. 6B is an enlargement of a portion of FIG. 6A;

FIG. 10 is an enlargement of a portion of the cover plate of FIG. 9;

FIG. 11 is a sectional view of the cover taken along lines 11-11 of FIG. 10;

FIG. 13 is another perspective view of the safety cover system of FIG. 12;

FIG. 14A is an enlargement taken along lines 14A-14A of FIG. 13;

FIG. 14B is an enlargement taken along lines 14B-14B of FIG. 13;

DETAILED DESCRIPTION OF THE PREFERRED EMBODIMENTS

The following description of the preferred embodiment(s) is merely exemplary in nature and is in no way intended to limit the invention, its application or uses.

Figure 1:
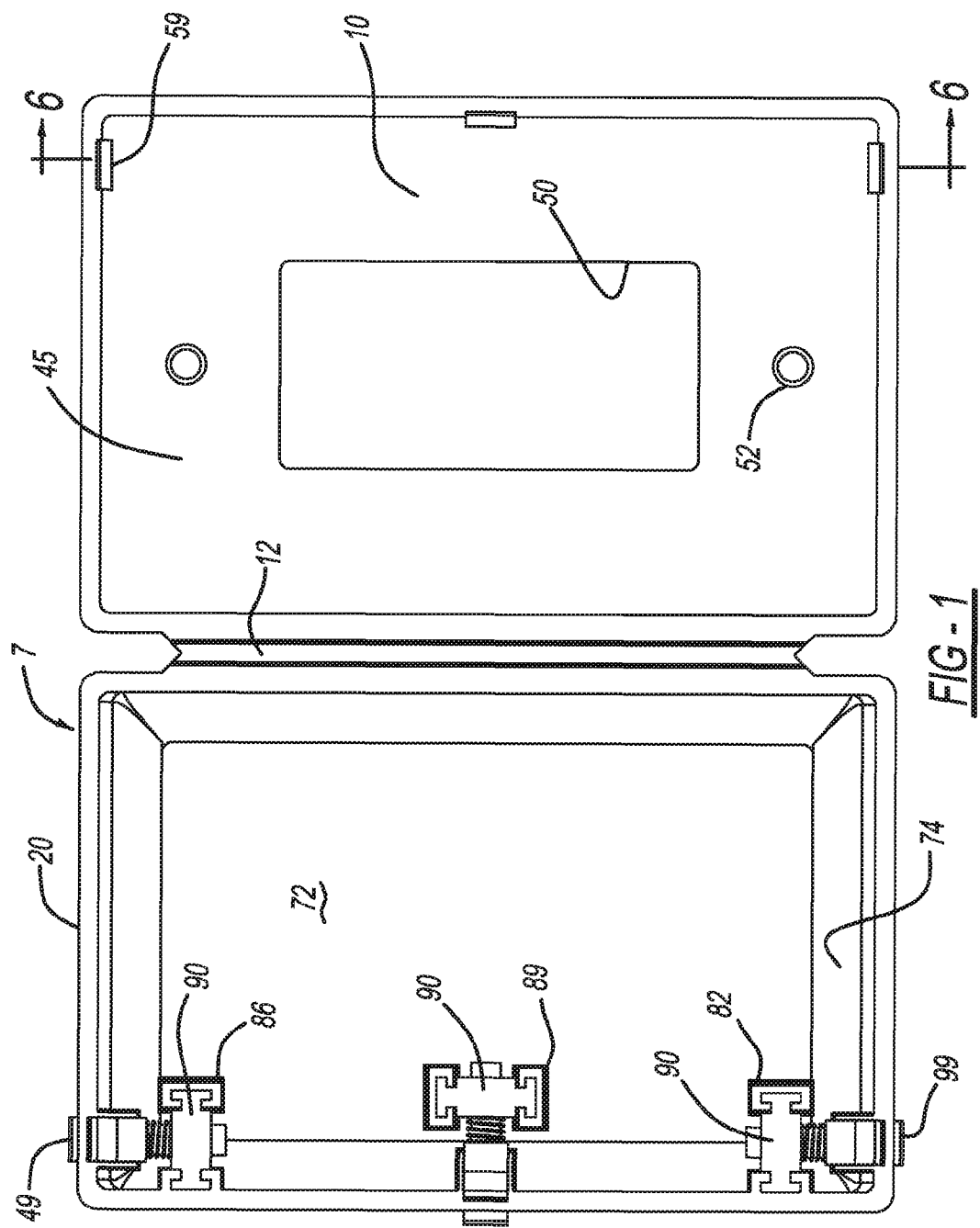
FIG. 1 is a front view with the cover open of the child restraint electrical safety cover system according to the present invention utilized for a modern electrical switch, modern electrical outlet, or a ground fault circuit interrupter.
Figure 2:
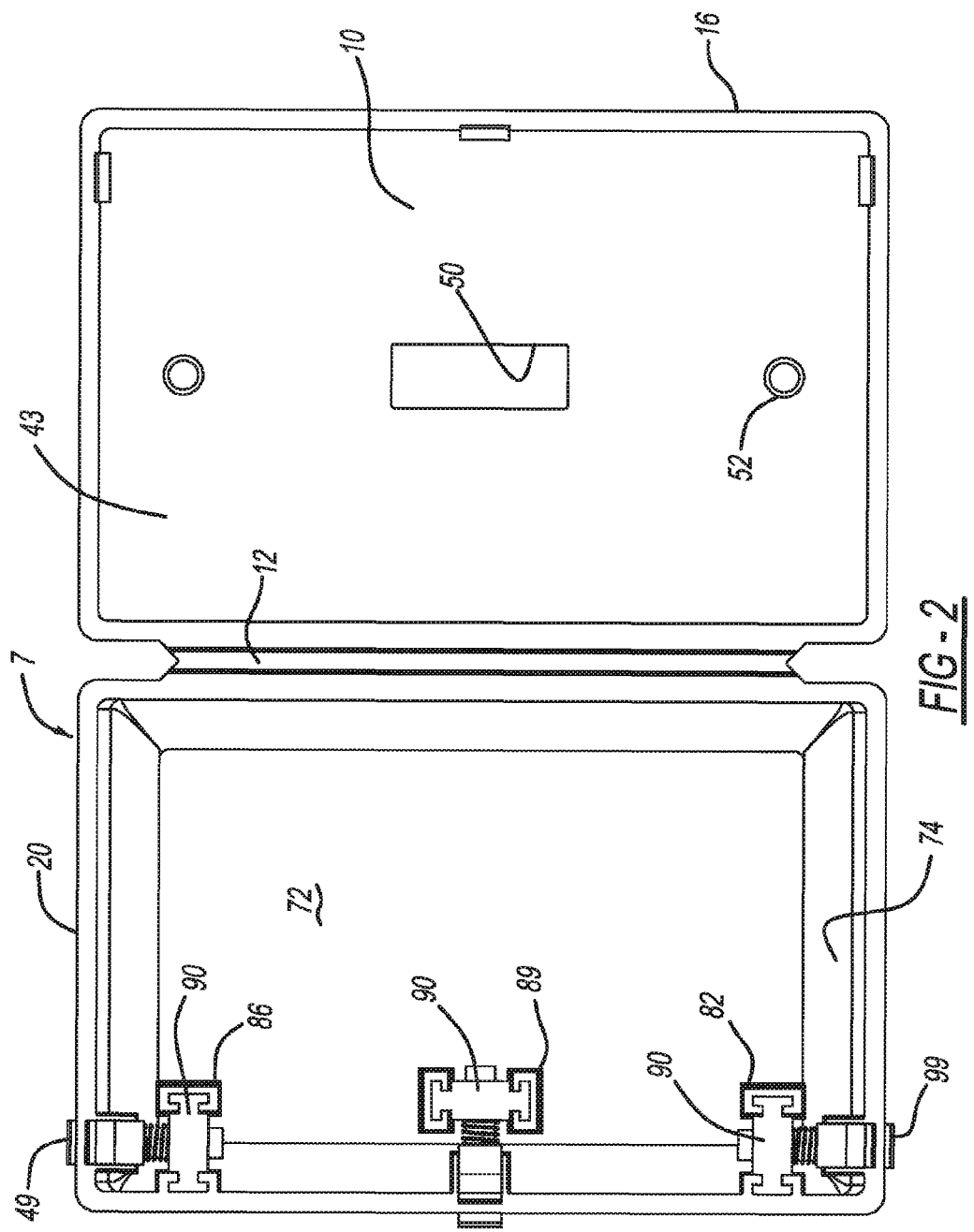
FIG. 2 is a front view with the cover open of the child restraint electrical safety cover system utilized for a conventional electrical switch.
Figure 3:
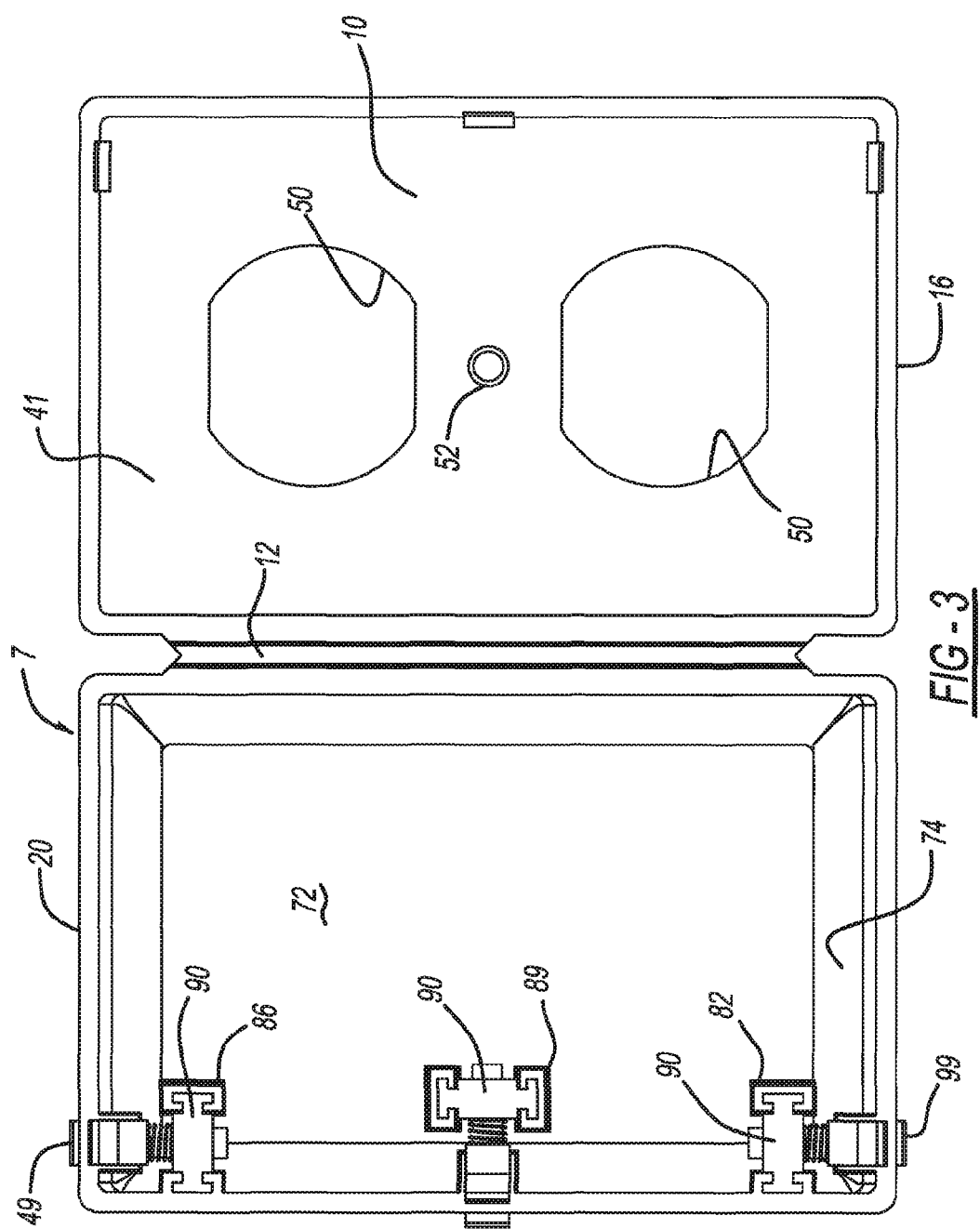
FIG. 3 is a front view with the cover open of the child restraint electrical safety cover system utilized for a conventional dual electrical outlet.

Referring to FIGS. 1-3, a child resistant safety cover system for electrical switches and outlets is provided. The safety cover system 7 includes a wall plate 10. The wall plate 10 may have upper and lower plastic or metal hinges (not shown) or a living hinge 12. The wall plate fascia has aperture(s) 50 for fitting about electrical outlets or to accommodate electrical switches. Referring additionally to FIGS. 6A and 6B, the wall plate 10 has a rectangular frame side wall 30. Side wall 30 adjacent its front end (the end that mates a cover plate 20) has latching rim lips 32 along its upper and lower extremities and its side opposite the hinge 12. The rim lips 32 are formed by indentations 35 in the side walls 30. The fascia can be for an electrical outlet such as a fascia 41, an electrical switch such as for fascia 43, or a ground fault circuit interrupter or other similar device such as fascia 45. As is apparent to those skilled in the art that each fascia will have an appropriate aperture 50 to accommodate the intended electrical device which will be covered. Additionally, each fascia typically has an aperture(s) 52 to allow the fascia to be directly connected to an electrical box that the electrical safety device is placed in. After utilization of a threaded fastener or screw 54, the fascia will secure the wall plate 10 securely to the electrical device. Fascias 41, 43 and 45 are shown as examples, but other fascias can be provided for other electrical devices, or for electrical devices in jurisdictions outside of North America wherein outlets or switching devices may differ in dimensions. The wall plate 10 is typically made of a polymeric material essentially similar to that utilized for most household wall plates. In a preferred embodiment, the wall plate and living hinge are injection molded with a suitable polypropylene or polyethylene material.

The rim lip 32 has as its forward end slight tapered portion 39 to ease engagement with a latching mechanism of the cover plate (to be explained). Additionally, the fascia can have a slight undercut 59 to facilitate the latching mechanism.

Figure 4:
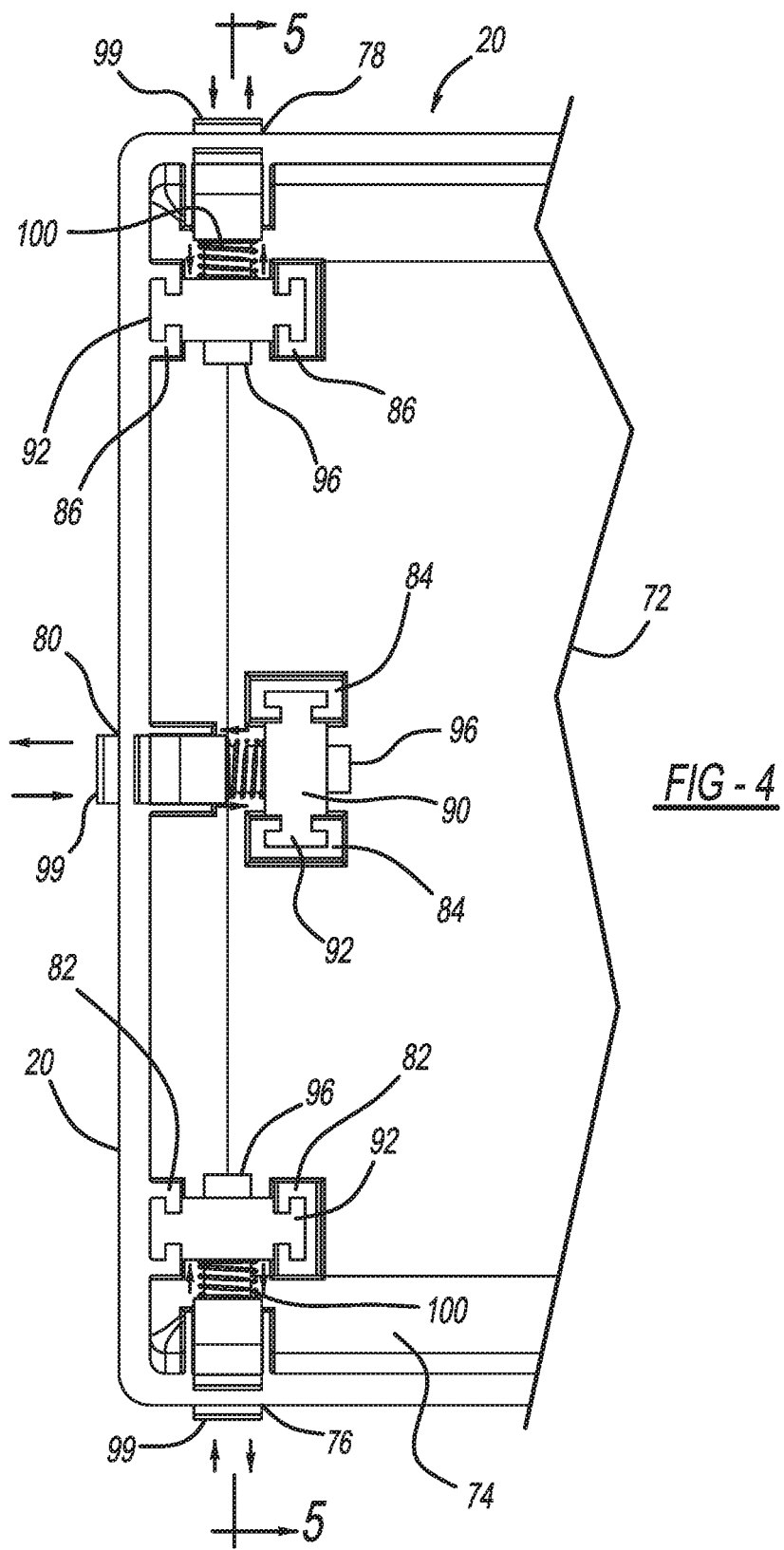
FIG. 4 is an enlarged view of a portion of a cover plate shown in FIGS. 1-3.

To cover the wall plate 10, a cover plate 20 (referring additionally to FIGS. 4 and 5) is provided. The cover plate 20 is connected to the wall plate 10 by the hinge 12 which allows the cover plate 20 to be pivotally connected with the wall plate 10 to cover the wall plate 10 and to prevent access to an electrical receptacle (not shown) or to an electrical switch (not shown). The cover plate 20 has a face plate 72. The face plate 72 is encircled by a generally rectangular rim portion 74. A bottom end of the face plate has a rectangular aperture 76. A top end of the face plate has a rectangular aperture 78. A side portion of the rim portion 74 has a rectangular aperture 80. An inside surface of the face plate 72 has two integrally molded C-shaped open towers 82. A middle portion of the face plate additionally has two C-shaped towers 84. A top end on the face plate has two C-shaped towers 86. Positioned in the C-shaped towers 82, 84 and 86 are alignment lower, side and upper release mechanism blocks 90. Each alignment block 90 has ears 92 which by interference fit are captured in their respective C-shaped towers. The alignment blocks 92 have a bore 94. Passing through the bore 94 is a cylindrical shaped plunger rod 96. An extreme end of the plunger rod 96 forms a rectangular cross sectional independently actuated release mechanism button 99 which is exposed to an exterior of the cover plate aperture. The buttons 99 should extend slightly out of their respective apertures. The surface 98 of the alignment blocks most adjacent to their respective aperture serves as a spring mount for a coil spring 100. Coil spring 100 additionally rests on a shoulder 102 provided on the plunger rod. The plunger rod has an integral formed arm 104. Arm 104 overlaps the rim lips 32. At the end of the arm 104 is a latch member 106. The latch member 106 forms a nest 108 that receives latching rim lip 32. Nest 108 not only captures rim lip 32 but also traps a portion 110 of the cover to ensure a secure closure of the cover with the wall plate 10. The buttons 99 are spaced apart at a distance that makes is substantially impossible for a child's hand to span the buttons 99. Therefore, the child cannot simultaneously push all there buttons 99

Figure 7:
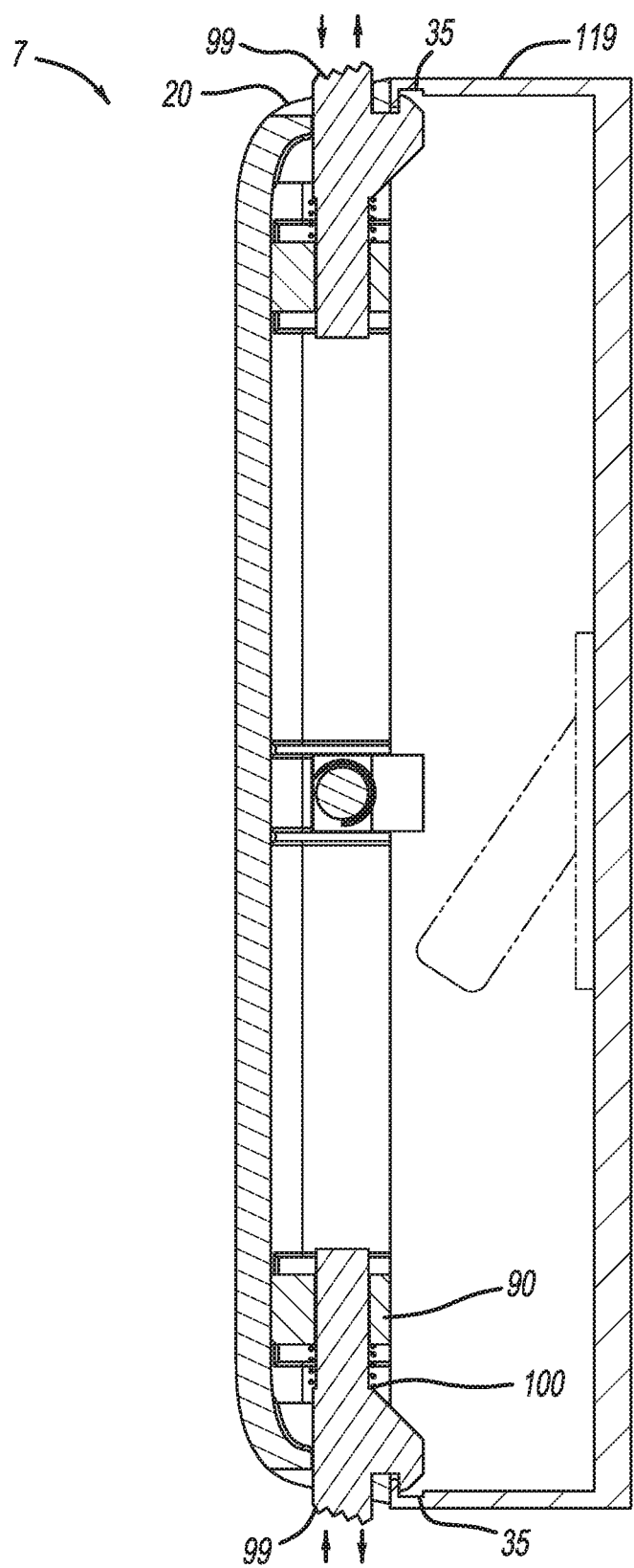
FIG. 7 is a side sectional view of the child restraint electrical safety cover system as shown in FIG. 2 with the cover closed.
Figure 8:
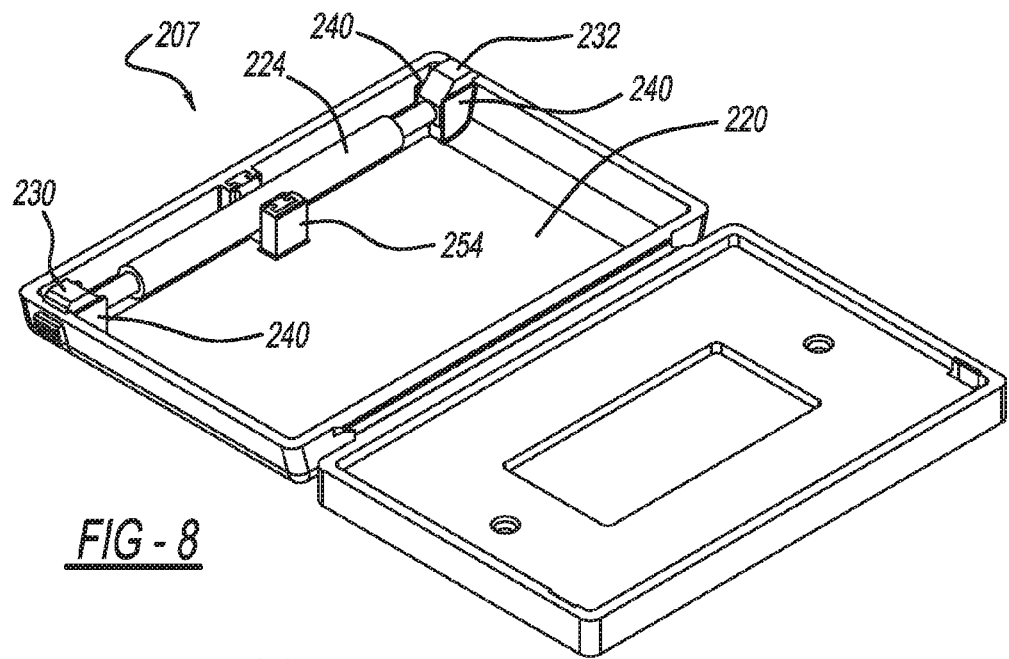
FIG. 8 is a perspective view of a safety cover system having a wall plate similar to that shown in FIG. 1 and with an alternate cover plate.
Figure 9:
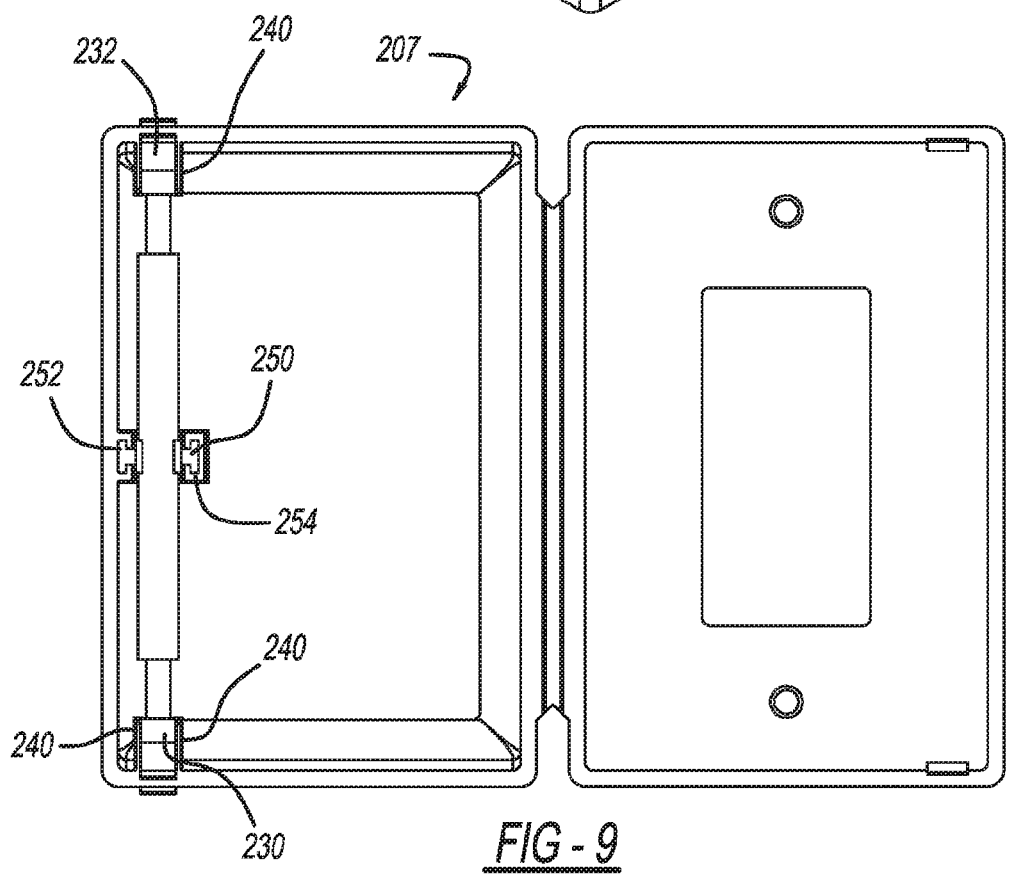
FIG. 9 is a front view of the safety cover system shown in FIG. 8.
Figure 12:
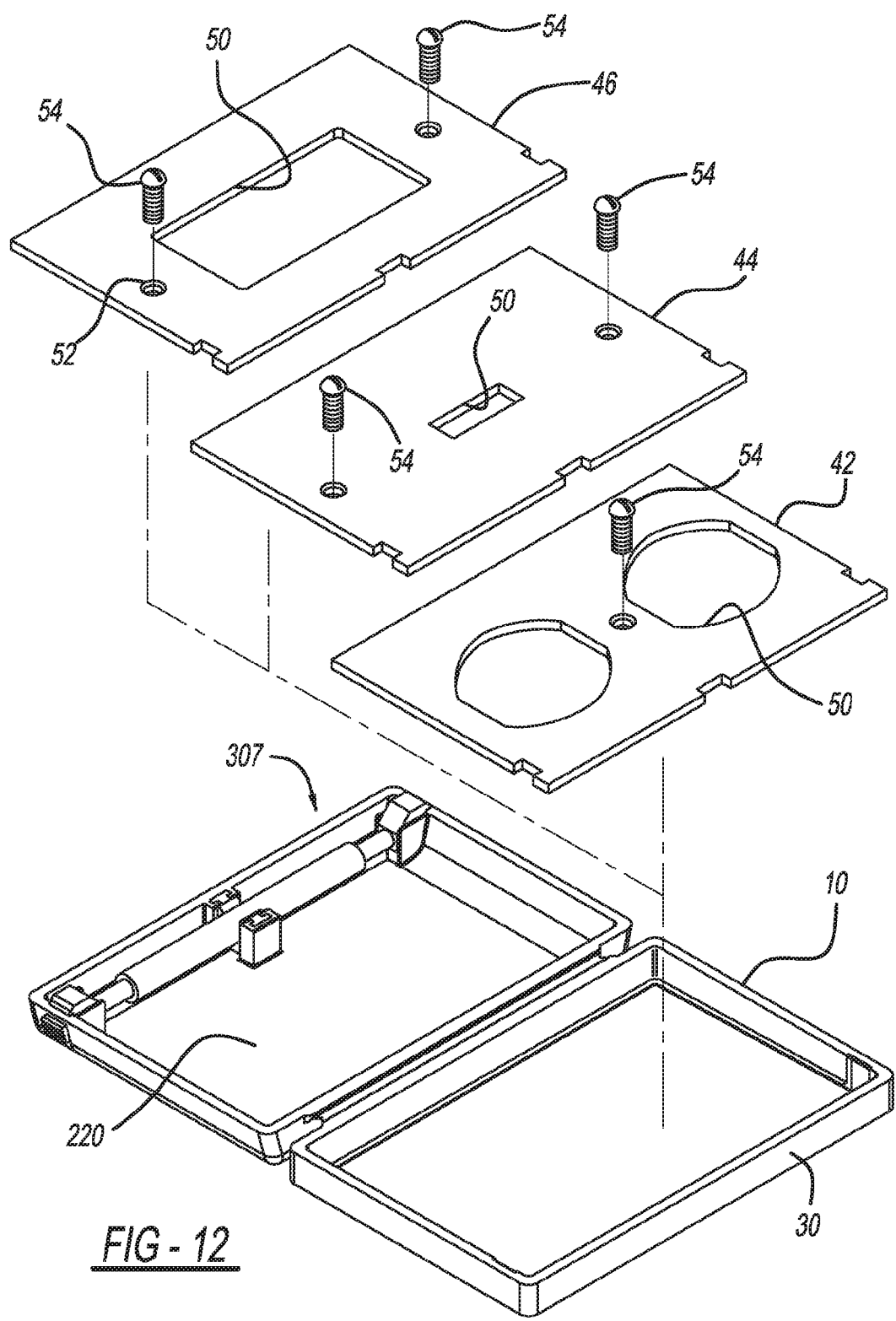
FIG. 12 is an exploded perspective view of the safety cover system of FIGS. 8-11 having a wall plate with selectable fascias.

FIG. 7 presents a sectional view of the safety cover system of FIG. 2 with the cover plate connected with the wall plate. A side wall 119 of the wall plate is lengthened to allow room for a pivotal electrical switch.

Referring to FIGS. 8-11, safety cover system 207 is virtually identical to safety cover system 7 with the exception that it has cover 220 with a latch tube 224 having latching mechanisms 230 and 232. Additionally, safety cover system 207 on its cover has alignment walls 240 which align the latching mechanisms 230 and 232. The latch tube is held in position by an alignment block 250 having ears 252 captured with C-shaped towers 254.

Referring to FIGS. 12-14B, the safety cover system 307 is virtually identical to safety cover system 207 with the major exception that its wall plate 10 can accommodate multiple fascias 42, 44 and 46 for differing electrical switches or outlets. The screw 54 that attaches the fascia to the electrical box will also secure the wall plate by virtue of the fascia being pressed against a surface 38 provided by a frame portion of the wall plate.

The safety cover system 307 has a rim lip 132 formed by a cut out 140 in the side wall 30. Rim lip 132 can have a tapper as previously described for the rim lip 32.

Figure 15:
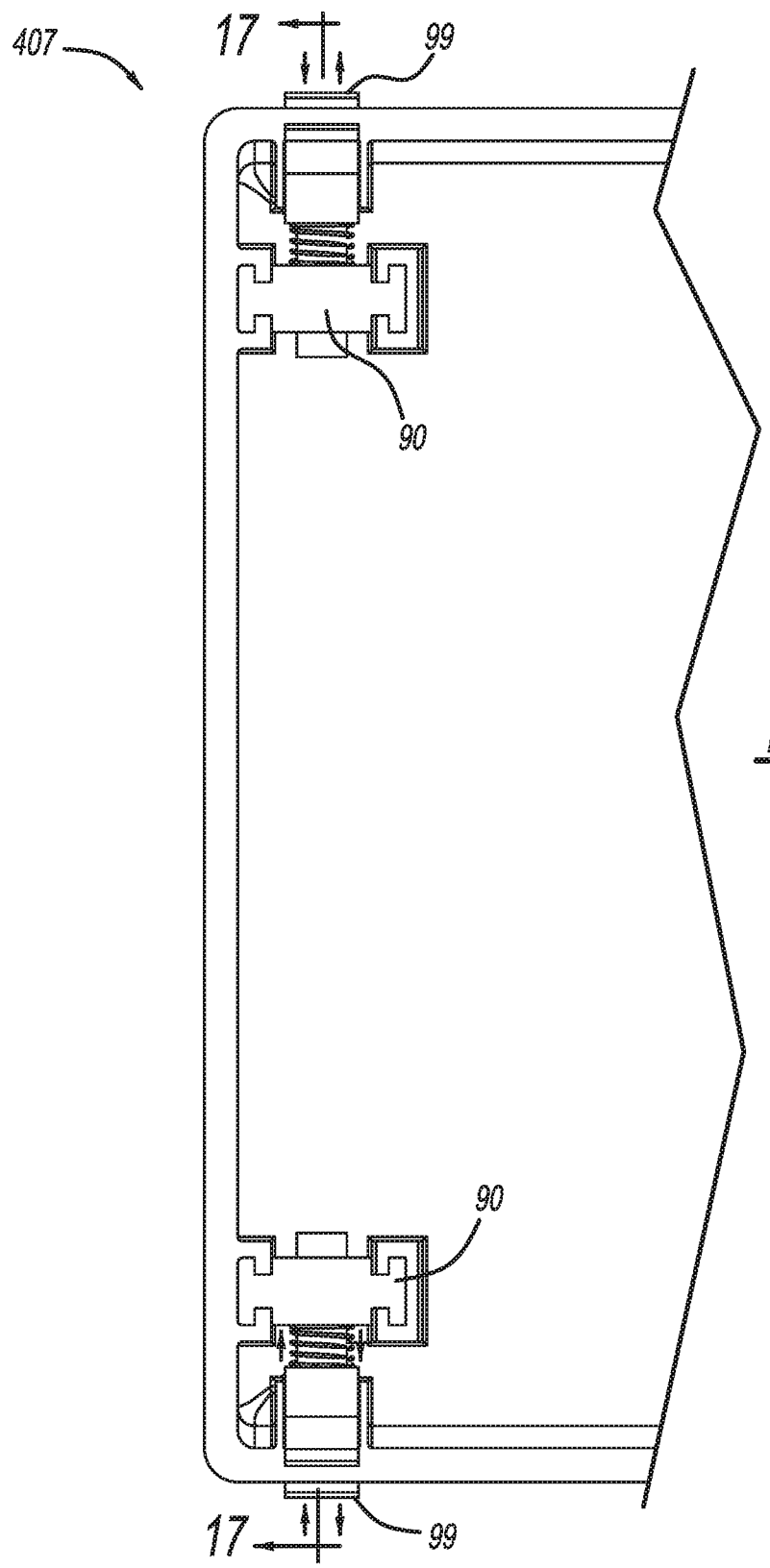
FIG. 15 is an enlargement of a safety cover system with a cover plate that is an alternative to the cover plate shown in FIGS. 1 and 10.
Figure 16:
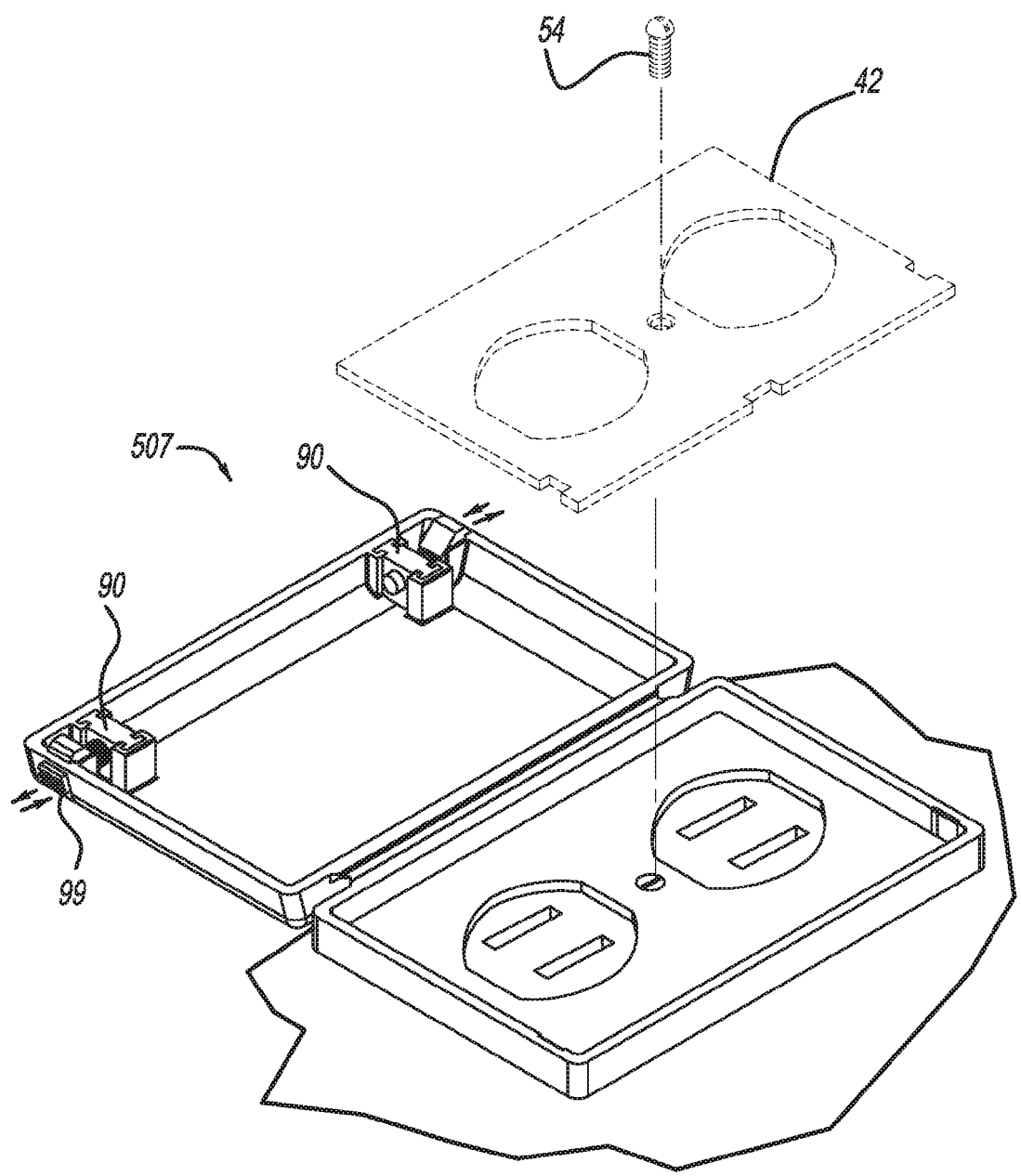
FIG. 16 is a perspective view of the safety cover system with a cover plate similar to that shown in FIG. 15, additionally illustrating a wall plate substantially similar to that shown in FIG. 12.
Figure 17:
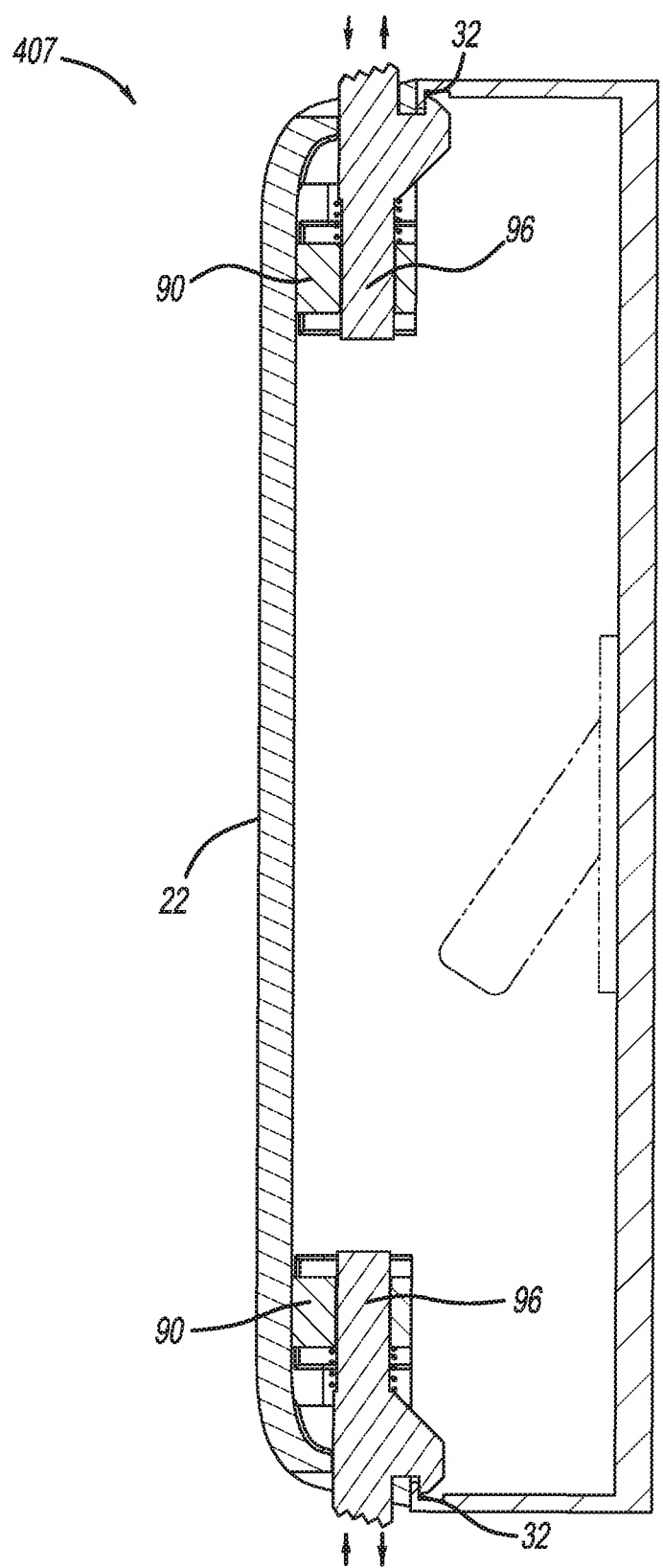
FIG. 17 is a view taken along lines 17-17 of FIG. 15.

Referring to FIGS. 15 and 17, a safety cover system 407 is very similar to the safety cover shown in FIG. 2, with the exception that it has two latching mechanisms instead of three. Referring to FIG. 16 a safety cover system 507 is provided very similar to that shown in FIGS. 12 and 15.

In operation (FIG. 1-7) the fascia is then secured to the electrical component with fasteners via apertures 52. The cover plate 20 is then closed and cam edge 107 will cause the latching mechanism plunger rod to be cammed by the latching rim lip 32 and then drop down into a latching position by virtue of the action of the coil spring 100. To release the cover plate 20, one must simultaneously release the top and bottom latching mechanisms as well as a side locking mechanism. This operation requires a person having hand length of an adult or mature adolescent. In the version of FIGS. 8-17, a thumb and one of the fingers must simultaneously push in the buttons. Again, this action will require a person having the hand length of an adult or mature adolescent.

The description of the invention is merely exemplary in nature and thus, variations that do not depart from the concept of the invention are intended to be within the scope of the invention. Such variations are not to be regarded as a departure from the spirit and scope of the invention.

What is claimed is:

1. A safety cover system for household electrical switches and outlets, said system comprising:
    a wall plate having an aperture for an electrical device, said wall plate having a rim portion with upper, lower and side latching lips;
    a cover plate hingeably connected with said wall plate for covering said wall plate aperture;
    a plurality of independently actuated release mechanisms including upper, lower and side release mechanisms, each of said release mechanisms having a button being exposed to an exterior of said cover plate through an aperture in said cover plate, and each of said release mechanisms having a latch with an arm overlapping said wall plate rim lip to prevent said cover plate from pivoting open from said wall plate, each of said release mechanisms having a plunger rod connected to one of said cover and said wall plate, each of said release mechanisms having a spring mount and a spring captured between said spring mount and said button to bias said button into a locked position, and wherein each of said release mechanisms include C-shaped towers on each of said cover plates and alignment blocks with ears captured in an interference fit within said towers, each of said alignment blocks having a bore that one of said plunger rods passes through, each of said blocks mounting a coil spring against a shoulder of one of said plunger rods.

2. The safety cover system of claim 1 wherein said wall plate includes at least one aperture for one of a group of apertures for electrical outlets and electrical switches.

3. The safety cover system of claim 1 wherein said alignment block also functions as a spring mount.

4. The safety cover system of claim 1 wherein said plunger rod and latch are unitary members.

5. The safety cover system of claim 1 wherein said wall plate has a frame, and multiple fascias can be placed in said frame for differing electrical switches and outlets.

6. The safety cover system of claim 1 wherein a fascia of said wall plate is integral with a latch lip of said wall plate.

7. The safety cover system of claim 1 wherein said cover plate is connected to said wall plate by a living hinge.

8. A safety cover system for household electrical switches and outlets, said system comprising:
    a wall plate, said wall plate having a frame and a selectable fascia, said fascia having an aperture for an electrical device, said fascia having an aperture for connection with said electrical device, said wall plate having a rim portion with upper, lower and side locking lips;
    a cover plate hingeably connected by a living hinge with said wall plate for covering said wall plate;
    a plurality of independently actuated release mechanisms including upper, lower and side release mechanisms connected with said cover plate, each of said release mechanism having a button being exposed to an exterior of said cover plate and projecting outwardly therefrom through a rectangular aperture in said cover plate, and each of said release mechanisms having a latch with an arm overlapping said wall plate rim lip to prevent said cover plate from pivoting open from said wall plate, each of said release mechanisms having a plunger rod integral with said latch, each of said release mechanisms having a spring mount and a spring captured between said spring mount and said button to bias said button into a locked position; and wherein each of said release mechanisms include C-shaped towers on said cover plate and alignment blocks with ears captured in an interference fit within said towers, each of said alignment blocks providing one of said spring mount.

9. A method of protecting an electrical outlet or switch or similar electrical device from children, said method comprising: providing a wall plate having an aperture for an electrical device, said wall plate having a rim portion with upper, lower and side locking lips; connecting said wall plate with said electrical device; providing a cover plate hingeably connected with said wall plate for covering said wall plate aperture; providing a plurality of independently actuated release mechanisms including upper, lower and side release mechanisms, each of said release mechanisms having a button being exposed to an exterior of said cover plate through a first aperture in said cover plate, and each of said release mechanisms having a latch with an arm overlapping said wall plate rim lip to prevent said cover plate from pivoting open from said wall plate, each of said release mechanisms having a plunger rod connected to one of said cover plate and said wall plate, each of said release mechanisms having a spring mount and a spring captured between said spring mount and said button to bias said release mechanism into a locked position, each of said release mechanisms having a blocker portion to block said button from excessive travel, and wherein each of said release mechanisms include C-shaped towers on said cover plate and alignment blocks with ears captured in an interference fit within said towers, each of said alignment blocks having a bore that one of said plunger rod passes through and wherein each of said alignment blocks provide one of said spring mounts; pivotally closing said cover plate on said wall plate aperture; and releasing said cover plate by simultaneously pushing all three buttons.

* * * * *

UNITED STATES PATENT AND TRADEMARK OFFICE
CERTIFICATE OF CORRECTION

PATENT NO. : 9,742,175 B2
APPLICATION NO. : 15/153233
DATED : August 22, 2017
INVENTOR(S) : George D. Melistas and Kaliopi E. Melistas It is certified that error appears in the above-identified patent and that said Letters Patent is hereby corrected as shown below:

In the Specification

Column 4,
Line 42, "there'" should be -- three --

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*